(12) United States Patent
Tveiten

(10) Patent No.: US 7,147,788 B2
(45) Date of Patent: Dec. 12, 2006

(54) SEPARATING A HYDROCARBON PRODUCTION STREAM INTO ITS OIL, WATER AND PARTICLE CONSTITUENTS

(76) Inventor: Magnar Tveiten, Bauneveien 7A, Sandnes (NO) N-4328

( * ) Notice: Subject to any disclaimer, the term of this patent is extended or adjusted under 35 U.S.C. 154(b) by 248 days.

(21) Appl. No.: 10/276,739

(22) PCT Filed: May 17, 2001

(86) PCT No.: PCT/EP01/05669

§ 371 (c)(1),
(2), (4) Date: Nov. 15, 2002

(87) PCT Pub. No.: WO01/87453

PCT Pub. Date: Nov. 22, 2001

(65) Prior Publication Data
US 2003/0168391 A1    Sep. 11, 2003

(30) Foreign Application Priority Data
May 17, 2000  (GB) ................... 0011928.9

(51) Int. Cl.
*B01D 17/038* (2006.01)
*B01D 21/26* (2006.01)

(52) U.S. Cl. .............. 210/788; 210/787; 210/806; 210/294; 210/304; 210/512.1; 210/512.2; 209/12.1; 209/719; 209/725; 209/729; 55/459.1

(58) Field of Classification Search .......... 210/787, 210/788, 806, 294, 304, 512.1, 512.2; 209/12.1, 209/719, 725, 729; 55/459.1
See application file for complete search history.

(56) References Cited

U.S. PATENT DOCUMENTS

| | | | |
|---|---|---|---|
| 3,764,008 A | 10/1973 | Darley et al. | |
| 4,399,041 A | 8/1983 | Rappe | |
| 4,737,271 A * | 4/1988 | Childs | .............. 210/788 |
| 5,021,165 A | 6/1991 | Kalnins | |
| 5,129,468 A | 7/1992 | Parmenter | |
| 5,350,525 A | 9/1994 | Shaw et al. | |
| 5,422,019 A | 6/1995 | Carman | |
| 5,961,841 A * | 10/1999 | Bowers | .............. 210/788 |

FOREIGN PATENT DOCUMENTS

| | | |
|---|---|---|
| WO | WO 92/19348 | 11/1992 |
| WO | WO 92/19352 | 11/1992 |
| WO | WO 97/11254 | 3/1997 |
| WO | WO 01/23707 | 4/2001 |

OTHER PUBLICATIONS

The Patent Office (Great Britain). Search Report under Section 17. Application No. GB 0011928.9, Oct. 10, 2000, 3 pages.
ISA/European Patent Office. International Search Report for PCT/EP01/05669, 3 pages.

\* cited by examiner

*Primary Examiner*—David A. Reifsnyder
(74) *Attorney, Agent, or Firm*—Haynes and Boone, LLP

(57) ABSTRACT

A separation method and apparatus are disclosed having particular application for effecting removal of sand from a production wellstream, enhancing the quality of recovered oil, gas and water output streams (12, 13, 14) and reducing erosion caused by entrained sand. The wellstream is passed initially through a cyclone separator (4') which separates substantially all the water and sand as underflow and substantially all the oil and gas as overflow. A gravity separator (11) separates the overflow from the cyclone separator (4') into oil, gas and water, and a further cyclone separator (17) separates the underflow from the first cyclone separator (4') into water and sand.

17 Claims, 7 Drawing Sheets

SEPARATING A HYDROCARBON PRODUCTION STREAM INTO ITS OIL, WATER AND PARTICLE CONSTITUENTS

This application is a national phase filing of international application No. PCT/EP01/05669, filed May 17, 2001, which claims priority to Great Britain patent application No. 0011928.9, filed May 17, 2000.

This invention relates to a method of separating a hydrocarbon production fluid stream from a production well, which stream contains a multi-phase mixture comprising oil and water and particles entrained therein, the mixture being rich in oil. More particularly, though not exclusively, the invention relates to a method of separating a hydrocarbon production stream (particularly when produced by water injection into a production well) into gas, oil and water streams, and sand or other entrained particles. It also relates to an installation for separating hydrocarbon production fluid comprising a multi-phase mixture of oil and water and particles entrained therein into individual constituents of said production fluid, said hydrocarbon fluid being rich in oil.

A production stream generally contains crude oil and hydrocarbon gas as principal valuable products, and also water and sand/silt (or other entrained particles, such as rock fragments) water is usually present naturally. However, where water is injected into the well to enhance recovery of oil and/or gas, the proportion of water present in the production stream will be higher than it the only water present is that occurring naturally in the subsea oil reservoir. Normally, the water and oil will be present in the production stream as a oil-in-water emulsion, i.e. the water forms a continuous phase and the oil a dispersed phase, or a water-in-oil emulsion, i.e. the oil forms a continuous phase and the water is a dispersed phase. Furthermore, gas, when present, will exist as a separate dispersed phase, i.e. as bubbles. Some of the gas will normally be dissolved in the liquid phases, the amount of dissolved gas varying according to the pressure of the stream at any point in question. The sand which is present typically exists naturally in the subsea reservoir, along with silt, and is normally supplemented by further sand produced as a result of the drilling operation carried out in the subsea earth formation, the action of water injection on unconsolidated formations, and gas and liquid pressure differentials acting across the production formation. The sand and silt or other particles are entrained in the phase mixture constituted by the oil, gas and water.

It is known to separate the components of a production wellstream using a gravity separator, in order to recover oil and gas as valuable products. Such a separator is essentially a large storage vessel or drum into which the wellstream is introduced and allowed to settle. Gravity causes the denser, generally dispersed, water phase to coalesce and settle to form a layer at the bottom of the separator, and the less dense, continuous, oil phase to form a liquid layer on top of the water layer. Hydrocarbon gas, present as a dispersed phase (bubbles) and in solution, separates from the water and oil and fills the atmosphere in the space above the liquid phase layer. Water, oil and gas can be tapped off periodically or continuously from the water and oil layers, and gas atmosphere, respectively.

Such a separator operates in a reasonably effective way to separate a hydrocarbon oil stream into its constituent parts. However, in certain situations, oil and water can form emulsions which are difficult to break in a conventional separator. Furthermore, the sand and silt present in the wellstream accumulate on the bottom of the gravity separator and have to be removed periodically. In addition, the sand and silt present in the wellstream cause erosion of the pipes along which is conveyed to the gravity separator, of the separator itself and of other components, such as chokes and control valves. Such pipes usually include a riser, connecting the wellhead manifold on the sea bed to the gravity separator which is usually onshore, or on a floating support vessel, rig, or production platform. Conventional thinking is to use a desander which removes the sand and silt in the wellstream before it is introduced into the gravity separator. One conventional form of desanding plant of this kind is shown in FIGS. 1 and 2 of the accompanying drawings.

FIG. 1 is a schematic view of one form of conventional desanding plant for removing sand from a production stream and separating the production stream into gas, crude oil, water and sand. In this Figure, an inlet manifold 1 receives a production fluid stream from one or more production wells through respective lines, one of which is indicated by reference numeral 2. The manifold 1 is situated on the sea bed, though it could instead be located on a production preparation platform or at a location intermediate that platform and the sea bed. It is connected by a riser 3 to a desanding plant 100 to be described, which is either onshore or carried by a support structures such as a floating vessel or rig, or a structure secured to the sea bed.

The mixture flowing in riser 3 is introduced into a cyclone separator 4. Cyclone separators as such are well-known in the art and rely on generated centrifugal and shear forces to achieve separation into two streams of different densities.

Briefly and as shown in FIG. 2, the cyclone separator comprises a chamber 40 having a vertical axis with an upper cylindrical portion 40a and a lower, inverted frustro-conical portion 40b. The mixture is introduced through a tangential inlet nozzle 41 to the cyclone separator, which causes heavier particles (wet sand/silt) to be flung, under centrifugal force, against the outer wall of the chamber and flow downwardly along, as underflow, and around the wall to a lower axial outlet 42, while the lighter, remaining, proportion of the mixture is drawn off by an axial pipe, known as a vortex finder, from a point within the body of the cyclone separator 4 as overflow and conveyed overhead through upper axial outlet 43. Suitably, the, cyclone separator may be of the form disclosed in U.S. Pat. No. 4,737,271, but other forms of cyclone separator, such as are well known in the art, may be used instead.

Of the constituents of the production stream, the sand and silt particles have the highest density, followed by the water, then oil and lastly the gas, which has the lowest density. The cyclone separator 4 is set up such that, essentially, it removes the sand from the stream, leaving oil, gas and water which passes out through the upper axial outlet 43 of the separator. In practice, though, the sand will contain a proportion of water, so that it leaves cyclone separator 4 via lower axial outlet 42 as wet sand in the form of a slurry. The wet sand is passed directly through line 5 into a sand accumulator 8, which takes the form simply of a large storage vessel. In this vessel, the sand builds up as a layer on the bottom of the storage vessel, with water settling out above. As the level of the sand rises, the sand displaces the overhead water upwardly so that, in effect, there is a discharge of wet sand from the underflow outlet 42 into the accumulator and a countercurrent migration of water in line 5, from sand accumulator 8 back up to the cyclone separator 4, where this water, as it is made available, is separated from the sand along with oil and gas and passed out through overflow axial outlet 43. Periodically, sand may be removed from sand accumulator 8, as indicated by reference numeral 9, to make space available for the accumulation of further sand in the accumulator 8. If desired, the sand may be cleaned and rinsed, ready for dumping.

The oil, water and gas mixture leaving cyclone separator 4 through its upper axial outlet 43 passes along line 10 to a gravity separator 11, which separates the mixture into its three constituents, oil, gas and water. The gas and oil are the valuable constituents which it is desired to recover. The produced water is a product having no particular value since its purity is not sufficiently high for many purposes. For example, it will contain traces of oil, which means that far environmental reasons the water cannot be discharged directly into the sea or into a local public sewer. Typically, the produced water will be used as injection water to be re-injected into the well to aid recovery of further oil and gas.

The gravity separator 11 is of known construction and comprises simply a large tank or drum into which the oil-water-gas mixture is introduced. In the container, the water droplets constituting the water phase coalesce to form a body or layer of water which settles under gravity to the bottom of the container, underlying the larger body of oil that forms on top of the water. The gas bubbles coalesce to form, along with gas coming out of solution, a gas atmosphere filling the remaining space inside the container above the body of oil. A gas line 13 is connected to this atmosphere, and oil and water lines 12, 14 are respectively connected to openings in the wall of the container such that they communicate with the oil and water layers, respectively. The pressure in gravity separator 11 is controlled by the setting of valve 51 in gas line 13. The gravity separator 11 is a crude but reasonably effective device for effecting the necessary separation between the gas, oil and water.

The cyclone separator is used, for the reason that a cyclone separator is a simple, reliable and relatively inexpensive piece of equipment that is highly effective in separating lower and higher density materials in the input feed. Therefore, the wet sand contains relatively little oil or gas and the mixture in line 10 contains relatively little sand and a relatively high percentage of the water from the production stream in riser 3. Furthermore, since conventional thinking is that the purpose of the cyclone separator is essentially to remove the sand so that the downstream components of the plant are protected from the corrosive action of sand, the plant is designed such that the cyclone separator 4 functions primarily to remove sand only. Although the sand removed from the sand accumulator 8 will contain a certain amount of water or moisture, the water content of the sand discharged from the sand accumulator is made to be as low as possible, commensurate with the design of the demanding plant.

For any given cyclone separator there is a separation or cut point, which determines which constituents of the inlet stream are directed into the upper axial outlet for lower density constituents and which are directed into the lower axial outlet for higher density materials. The separation point corresponds to a density which has an equal probability of exiting from either axial outlet. Higher density constituents will normally mainly leave the lower axial outlet as underflow though the overflow will also then include a small amount of the higher density constituents. For increasing densities of higher density constituents, the proportion in the underflow will increase while that in the overflow will decrease. Correspondingly, lower density constituents will generally mainly leave the upper axial outlet as overflow, though the underflow will also then include a small amount of lower density constituents for reducing densities of lower density constituents, the proportion in the overflow will increase while that in the underflow will decrease. In this way a separation is effected as between constituents of different densities by appropriate selection of the separation point.

The most significant parameters determining the separation point are the internal diameter of, the vortex-finder, around which the tangential inlet stream enters the cyclone separator, and the inlet pressure. The vortex-finder diameter is a design parameter of the cyclone separator and the inlet pressure is adjusted by a control valve 15 which is located either in riser 3 or in line 10. It also follows that where a cyclone separator is to be used to effect a separation between two phases of a phase mixture of significantly different densities, one of the two output streams produced by the cyclone separator can be caused to contain essentially no amount of one of the two phases by setting the cut point to a density that is between those of the two phases tinder consideration but nearer to that of that one-phase.

Reference is now made to FIG. 1*a*. This Figure indicates the relative densities ρ of sand, water, oil and gas. The actual values of density for the sand, oil and gas in the production stream will vary from well to well, possibly even with time for the same well, but the relative densities shown are typical. Also as shown, the cut point [4] of cyclone separator 4 corresponds to a density between those for sand and water. On the one hand, the cut point [4] is chosen to correspond to a density that is as small as possible relative to the density of sand no as to minimise the carry over of sand into the overflow stream. On the other hand, the nearer it comes to the density of oil and gas, the greater the quantity of trace oil and gas in the underflow from the cyclone separator. The actual choice of the cut point is therefore a trade-off between these two conflicting operating requirements.

Whilst the described conventional desanding plant is reasonably effective in removing sand and water from the valuable oil and gas, as indicated above, a small proportion of the sand remains in the oil and gas stream leaving as overflow. This entrained sand passes to the gravity separator 11. The presence of this sand in the gravity separator then occupies part of the separator capacity. Furthermore, its presence reduces the quality of the final separation products. Still further, the presence of unwanted sand in line 10 and gravity separator 11, albeit in trace amounts, causes erosion of the wall of line 10 and of the internals of gravity separator 11. A need therefore exists for a desanding plant which is more effective in the removal of sand, in which the final output gas, oil and water lines are of improved purity and in which the erosion of components of the plant is reduced or substantially eliminated.

Reference is now made to a selection of prior art references.

U.S. Pat. No. 5,350,525 (Shaw et al) discloses a system for separating a multi-phase liquid mixture, such as production hydrocarbons from a well, into a plurality of streams. Following an initial separation in a 3 phase gravity separator to produce a gas stream, an oil stream and a water stream (including small residual amounts of oil and sand), the oil-lean water stream is subjected, to a treatment process in which it initially has heavier sand particles removed, is then passed through a liquid-liquid hydrocyclone to remove the oil and lastly is passed through a solid-liquid hydrocyclone to form a particle-rich slurry as underflow and solids-free water as overflow.

In U.S. Pat. No. 5,021,165 (Kalnins), an oil-in-water feed to a hydrocyclone is separated into oil and water. A further hydrocyclone can be used to remove solids from the water. Residual oil in the water is separated using a flotation cell.

U.S. Pat. No. 4,399,041 (Rappe) discloses the use of two staged hydrocyclones to provide staged separation of solids.

With reference to U.S. Pat. No. 3,764,000, production fluid is initially subjected to separation into gas, oil and water (containing oily sand), the latter being treated in staged hydrocyclones to separate oily water and de-oiled sand, leaving clean water.

Reference la also made to WO-A-97/11254 (Baker Hughs Ltd) in which staged hydrocyclones are used to separate firstly the oil from the bulk of the water and sand of a production fluid and secondly the bulk of the sand from the water, leaving a solid depleted water stream.

According to the invention from one aspect, there is provided a method of separating a hydrocarbon production fluid stream from a production well, which stream contains a multi-phase mixture comprising oil and water and particles entrained therein, into individual constituents of said production fluid, said mixture being rich in oil, said method comprising the steps of passing the stream into a first cyclone separator having a cut point corresponding to a density between the densities of the oil and heavier water to produce an underflow that is rich in heavier water and particles and an overflow that is rich in oil, passing the overflow from the first cyclone separator to a first separation means to effect a separation into oil and water, and passing the underflow to a second separation means to effect a separation of the underflow into a flow that is rich in water on the one hand and particles on the other hand.

Since the separation (cut) point of the cyclone separator is set to correspond to a density between the densities of the oil and water not only the particles (normally sand) but also substantially all the (less dense) water is included in the underflow and the effectiveness of separation of the particles from the oil is enhanced. Furthermore, the internal components of the demanding plant receiving the overflow from the cyclone separator, in particular those of the first separation means, are less prone to erosion. In addition, the method provides a simple and effective way of breaking the multi-phase hydrocarbon mixture, so as to coalesce the dispersed phase.

Where the stream further includes a hydrocarbon gas phase, the stream, including the gas phase, may be passed initially into a second cyclone separator to effect a separation into an overflow that is rich in gas on the one hand and an underflow that in rich in multi-phase mixture and entrained particles on the other hand, the underflow rich in multi-phase mixture and particles then being introduced as feed into the first cyclone separator.

Suitably, a separation of the underflow from the first cyclone separator is effected by a third cyclone separator of the second separation means into an overflow containing a major proportion of water and substantially no particles and an underflow containing a minor proportion of water and particles, and a separation of the underflow from the third cyclone separator is effected by a particle accumulator of the second separation means into particles on the one hand and water on the other hand.

Conveniently, the first separation means effects separation into oil, water, and, where applicable, gas by gravity separation.

In one preferred way of putting the invention into effect, the first cyclone separator has its cut point corresponding to a density closer to that of the water so that the overflow from the first cyclone separator contains a minor proportion of water and its underflow contains substantially no oil, and the overflow from the third cyclone separator is combined with the water produced by the first separation means.

In an alternative way of putting the invention into effect, the first cyclone separator has its cut point corresponding to a density closer to that of the oil so that the underflow from the first cyclone separator contains a minor proportion of oil and its overflow contains substantially no water, and the overflow from the third cyclone separator is combined with overflow from the first cyclone separator. This latter method has the advantage that since the amount by which the cut point of the first cyclone separator is below the density of sand is greater than in the case of the preceding way of performing the invention, any trace amount of sand in the overflow from the first cyclone separator is further reduced.

In a further way of putting the invention into effect, the first cyclone separator may have its cut point corresponding to a density closer to that of the oil so that the underflow from the first cyclone separator contains a minor proportion of oil and its overflow contains substantially no water. Then, a separation of the underflow from the first cyclone separator is effected by the second separation means into a flow of water containing said minor proportion of oil on the one hand and particles on the other hand, and a separation of the flow from the second separation means is effected by a fourth cyclone separator essentially into water on the one hand and oil on the other hand.

It is preferred that measurements are made indicative of the quality of one output stream roam a said cyclone separator and the measurements are used to control a parameter (for example flowrate) of the overflow from that cyclone separator to increase the quality of one output stream or the other from that separator. By optimising quality in this way, the separation method can produce separation products, at least some of which are of high quality. Furthermore, where for example a flow control valve is used to adjust the flow rate, this valve being located in the overflow line, that flow control valve is not exposed to said erosion. In general, it is also possible to effect control of a cyclone separator at an upstream location according to measured parameters of the constituents of the streams at downstream locations(s), such parameters being flowrate, pressure or volumetric split ratios between the constituents.

In a preferred arrangement where the controlled parameter is the flow rate of the overflow from at least one cyclone separator, ouch flow rate is additionally controlled in dependence on the pressure existing in at least one flowline containing one or more of the constituents of the stream.

The invention is also concerned with an installation for separating hydrocarbon production fluid comprising a multi-phase mixture of oil and water and particles entrained therein into individual constituents of said production fluid, said hydrocarbon fluid being rich in oil.

According then to the invention from a second aspect, there is provided an installation for separating hydrocarbon production fluid comprising a multi-phase mixture of oil and water and particles entrained therein into individual constituents of said production fluid, said hydrocarbon fluid being rich in oil, comprising a production well for producing said hydrocarbon production fluid stream, a first cyclone separator connected to receive said production fluid stream as feed from said production well, said cyclone separator having a cut point corresponding to a density between the densities of the oil and water to produce an underflow that is rich in water and particles and an oil-rich overflow, a first separation means arranged to receive the overflow from the first cyclone separator an teed and to separate the same into lighter density liquid and heavier density liquid and a second separation means for effecting a separation of the underflow into a water-rich flow on the one hand and particles on the other hand.

Preferably, the installation is located on a seabed adjacent a production fluid wellstream manifold, so as to minimise exposure to the erosive effect of sand/silt or other particles in the production fluid from the source.

For a better understanding of the invention and to shoe how the same may he carried into effect, reference will now be made, by way of example, to the accompanying drawings, in which.

Figure 1:
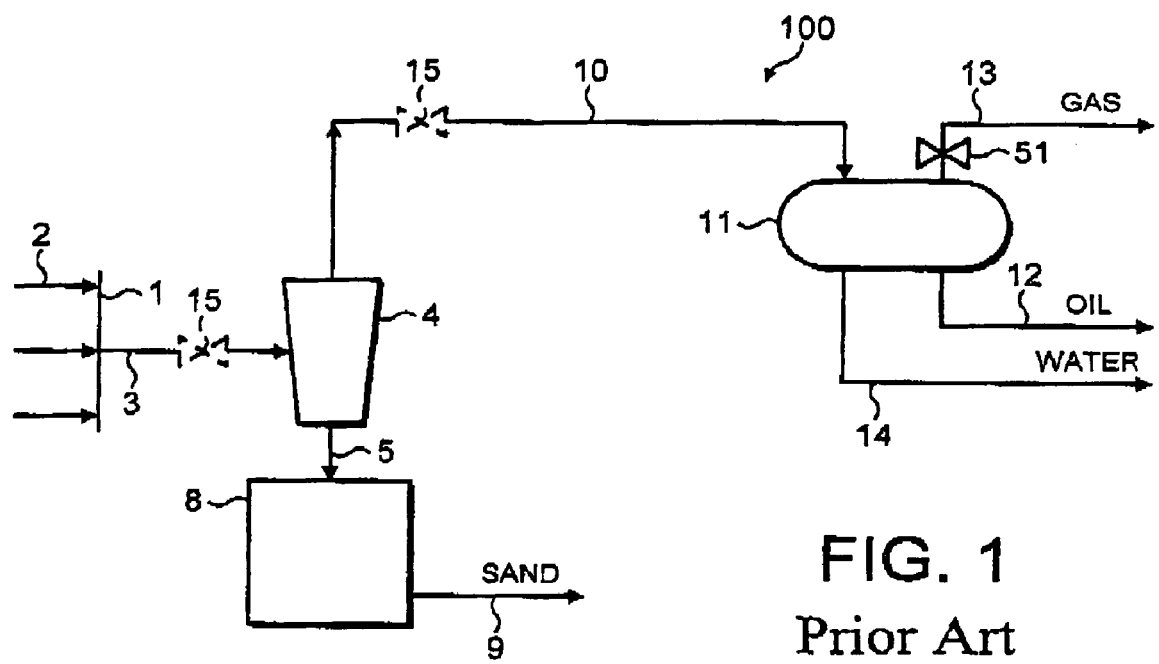
FIG. 1 is a schematic view of a conventional desanding plant for removing sand from a production stream and separating the production stream into gas, crude oil and water.
Figure 2:
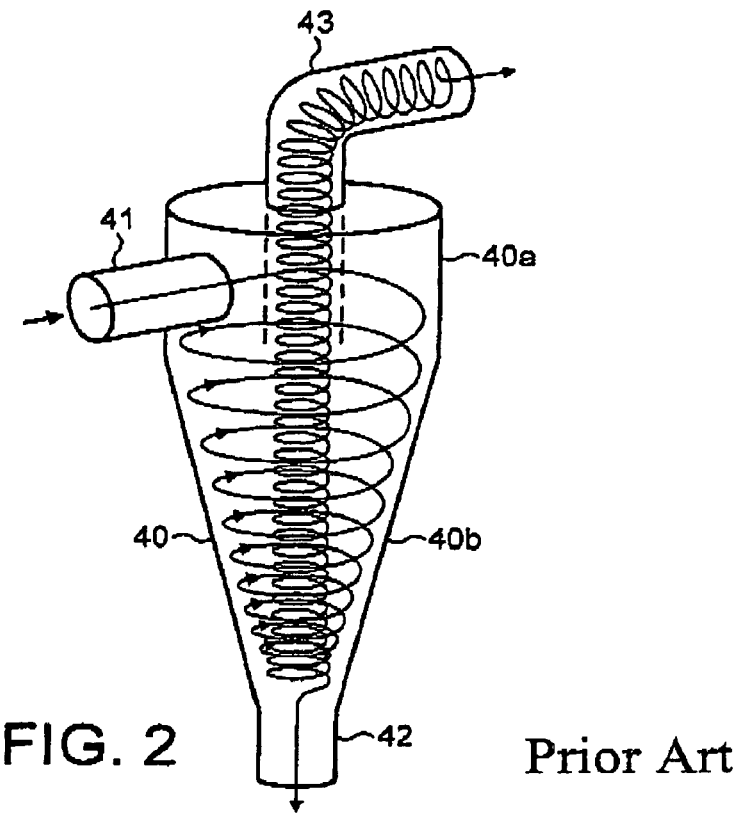
FIG. 2 is a perspective view of a cyclone separator included in the desanding plant.

In the description which follows, like reference numerals denote the same or corresponding components as between different embodiments and also in relation to the conventional desanding plant according to FIGS. 1 and 2. Furthermore, a description is given only of those components and those operational features that differ from the corresponding ones in FIGS. 1 and 2.

Figure 3:
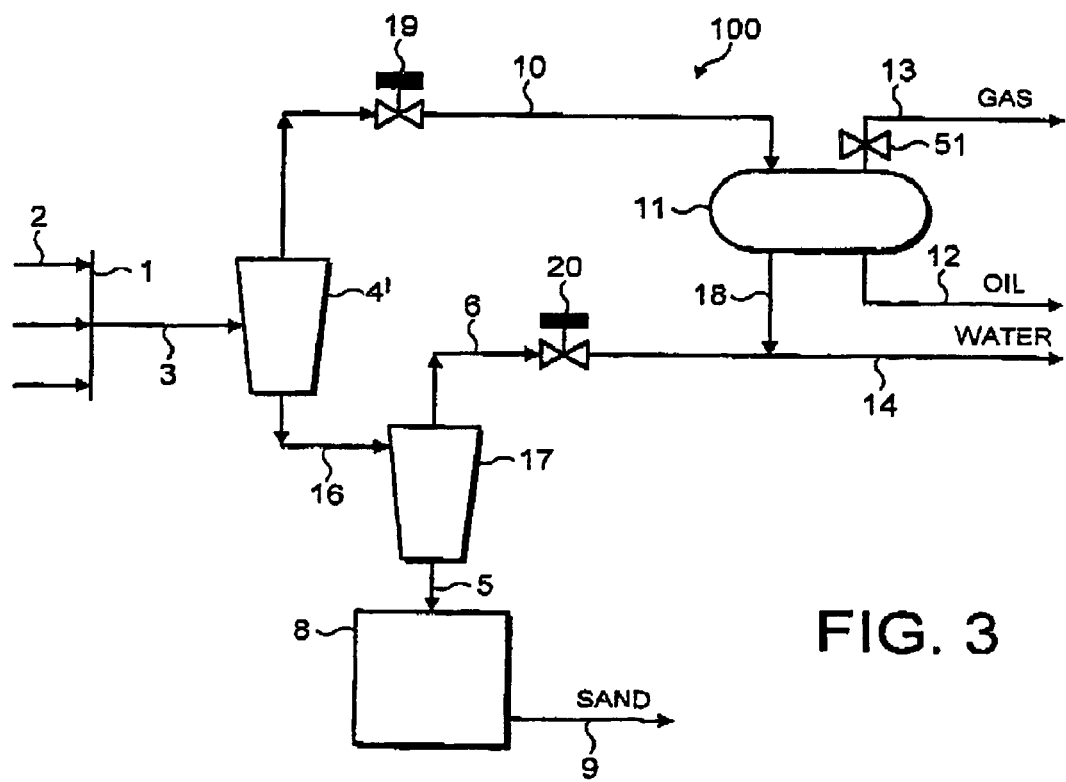
FIG. 3 is a corresponding schematic view of a first embodiment of the invention.

A first embodiment of the invention is shown in FIG. 3. In this embodiment the production stream passes from manifold 1 to a first oil/water cyclone separator 4' via line 3. As in the conventional system according to FIG. 1, the line 3 may be in the form of a riser and the demanding plant to be described can be located onshore, on a floating support or on a platform that stands on the sea bed. Alternatively, the desanding plant may be located on the sea bed, in which case the line 3 will be simply a short pipeline.

Figure 3A:
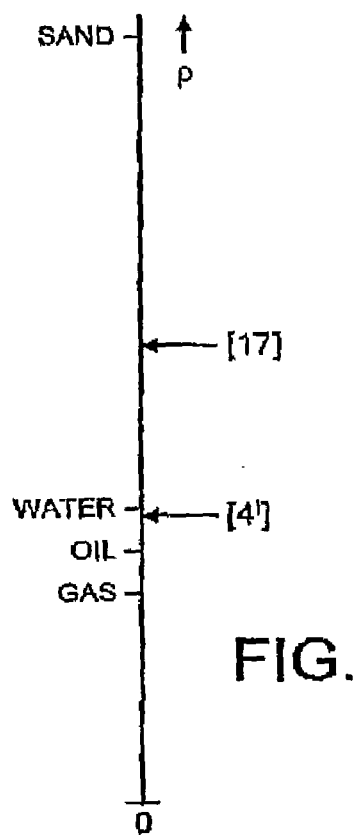
FIG. 3a is a diagram useful for understanding operation of the first embodiment.

The cyclone separator 4' differs from the cyclone separator 4 in the conventional desanding plant according to FIG. 1 in that it is set up with a different separation point for the cyclone separator 4', as indicated in FIG. 3a (see [4']). Specifically, the cyclone separator 4' is set up such that its cut point corresponds with a density nearer that for water than that for oil. As a result, not only the sand present in the stream supplied by line 3 but also substantially all the water is separated as underflow in the cyclone separator but a minor proportion of water will be included with the oil and gas which pass upwardly as overflow (overhead). Although it is desirable to minimise the water content of the oil-gas mixture flowing in line 10, nevertheless, it is important that the presence of some water in line 10 be accepted, since then it will be known that there can be even less oil, or to all practical intents substantially no oil, in the underflow stream because the cyclone separator effects separation into two streams according to density. In view of the different separation point chosen for the cyclone separator 4', in particular one which separates not only the sand but also (less dense) water or, expressed another way, since the difference between the density corresponding to the cut point of cyclone separator 4' and the density of sand is larger than in the case of the desanding plant of FIG. 1, a higher proportion of sand is removed than in the case of the conventional desander according to FIG. 1. Furthermore, particularly when siting the plant on the sea bed and as close as possible to the manifold 1 (i.e. the line 3 will be of very short length), substantially all the sand is removed at the point of entry into the desanding plant 100 and as close us possible to the wellstream manifold, so that as short a length of line 3 as possible is exposed to sand erosion, and the line 10 and all downstream equipment, especially the gravity separator 11, are largely protected from erosion.

The sand-water slurry or stream exiting the cyclone sand/water separation means, comprising cyclone separator 17 and sand accumulator 8. The second cyclone separator 17 separates the sand and water, the sand with a small proportion of water exiting as underflow (wet sand) along line 5 to sand accumulator 8 with counter-current migration of water displaced from the sand accumulator back up line 5 to the cyclone separator 17 through its lower outlet, and the water separated in cyclone separator 17 exiting through its upper outlet of the cyclone as overflow and passing along water line 6.

Figure 1A:
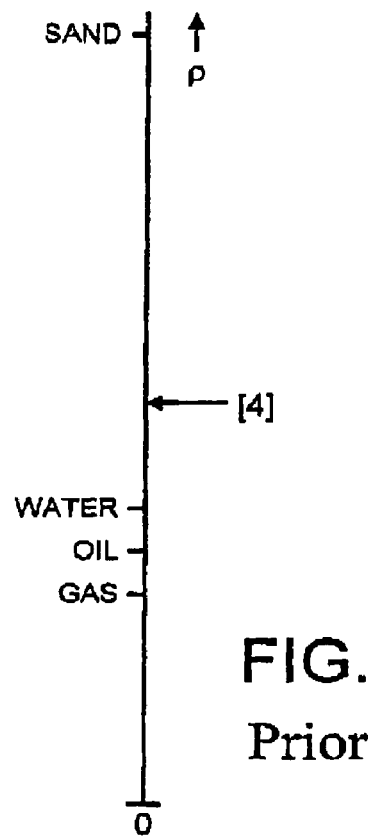
FIG. 1a is a diagram useful for understanding operation of the plant according to FIG. 1.

The density corresponding to the cut point [17] for the cyclone separator 17 is indicated in FIG. 3a, the cut point density value chosen is a trade-off between being as far below the density of the sand/silt as possible, so that as near to 100% of the sand present in the feed to the cyclone separator 17 is separated and directed into the underflow, and being sufficiently above the density of water such that an adequate proportion of the water from the feed is directed into the underflow to form a sand-water slurry of sufficient mobility that it can pass, without forming a blockage, through line 5 to sand accumulator 8. Normally, the cut point for the cyclone separator 17 will be somewhat closer to the density of water than that of the sand/silt, as shown in FIG. 1a.

In the gravity separator 11, a separation is effected just as in the known desanding plant according to FIG. 1 as between the gas, oil and water delivered through line 10, though in this case water is present only in trace amounts. The separated water is drawn off along line 18 and combined with the water in line 29, to form water flow in water line 14.

Lines 10 and 6 include respective control valves 19 and 20 which are used for adjusting the flow rates in these lines, for controlling the separation that is effected in the cyclone separators 4', 17. The manner in which such control is effected is described hereinbelow, with reference to FIG. 8.

Figure 4:
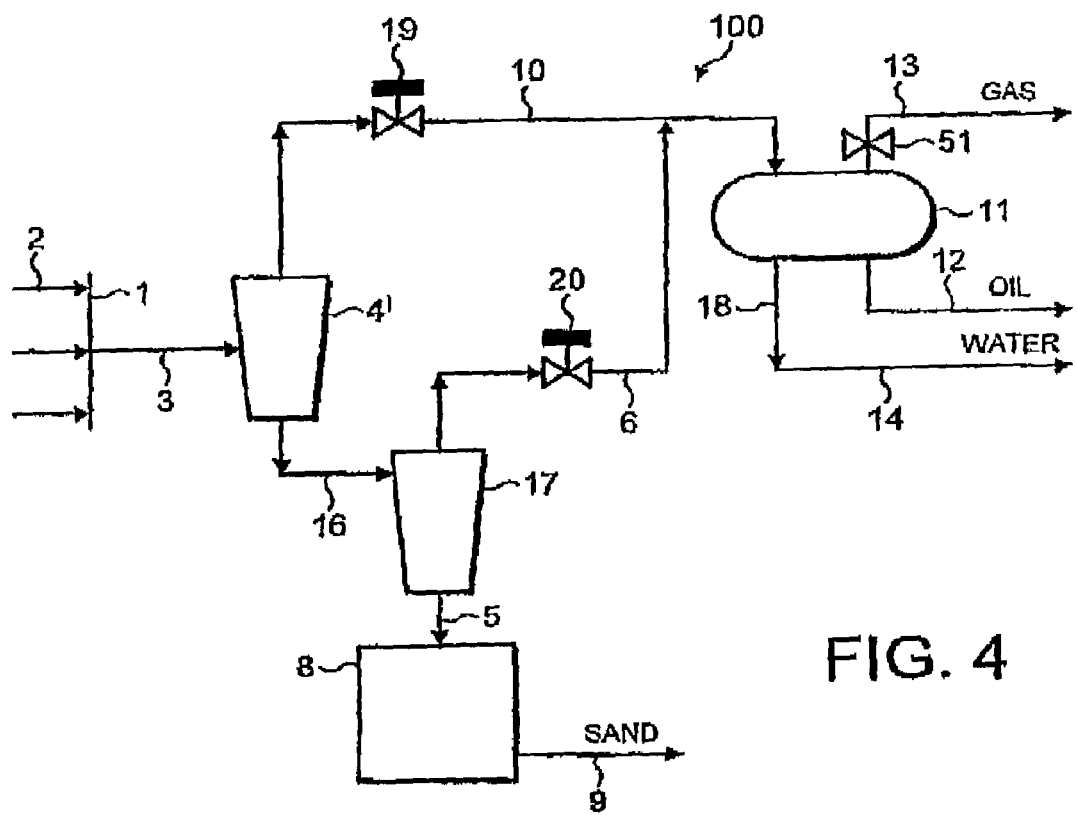
FIG. 4 is a modification to the first embodiment.
Figure 4A:
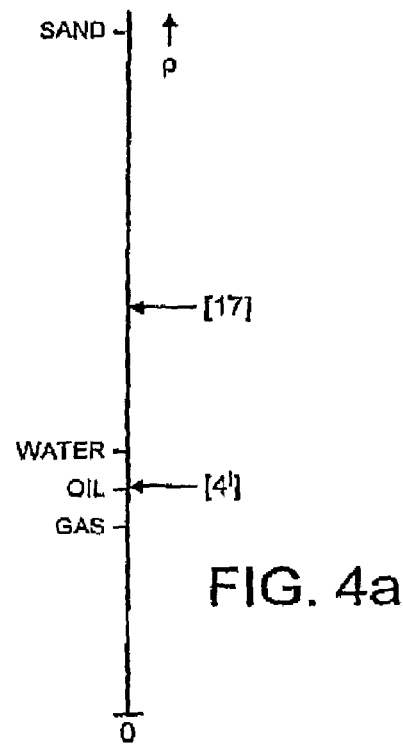
FIG. 4a is its corresponding operation diagram.

FIG. 4 shows a modified desanding plant. In this embodiment, as shown in FIG. 4a, the cut point [4'] of cyclone separator 4' is different from that in the FIG. 3 embodiment. Specifically, it corresponds with a density that is nearer to that of the oil than that of water, so that the underflow from cyclone separator 4' contains a minor proportion of oil but its overflow contains substantially no water. In the sand/water separator 17, whose cut point is the same as or similar to that used in the FIG. 3 embodiment, the small amount of oil present in the feed is separated and discharged, along with a major proportion of the water from the feed, as overhead. In view of the non-negligible oil content, line 6 from the upper outlet of cyclone separator 17 conveys the overflow (overhead) of that separator to line 10 (rather than directly to water line 14), so that the overflow from cyclone separator 17 mixes with the overflow from cyclone separator 4', the mixture then being introduced into gravity separator 11 for separation into oil, gas and water.

Figure 5:
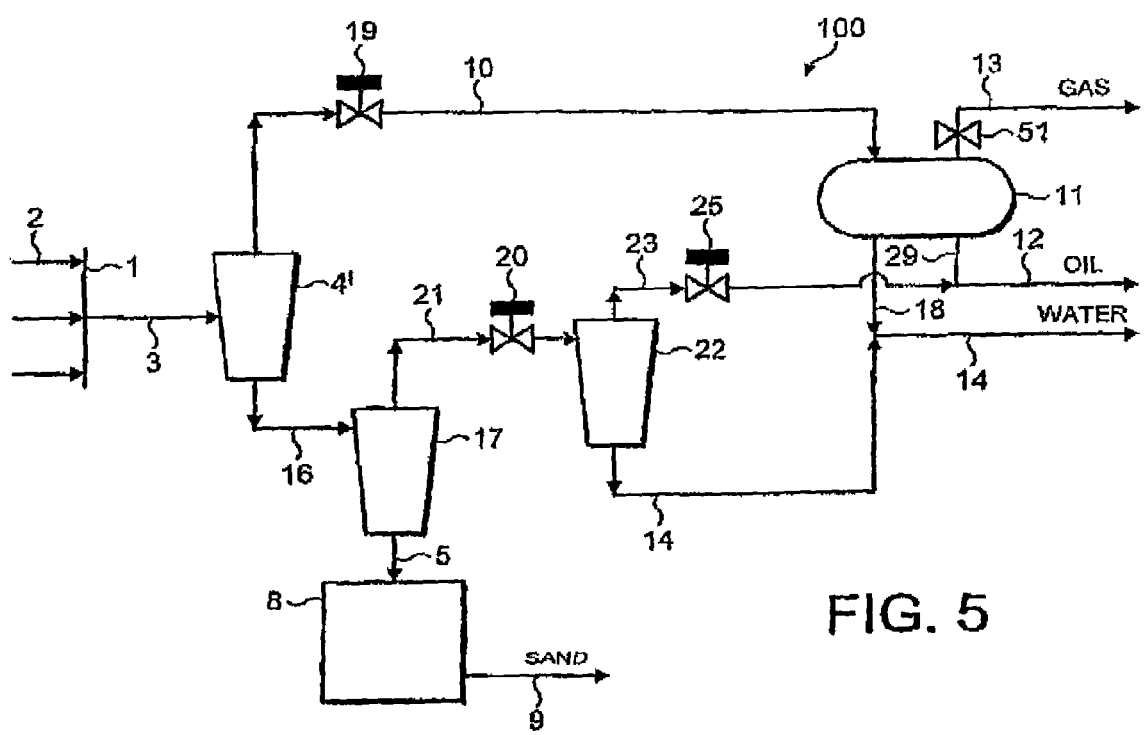
FIGS. 5 to 7 are corresponding views of second to fourth embodiments, respectively, of the invention and FIGS. 5a to 7a their corresponding operation diagrams.
Figure 5A:
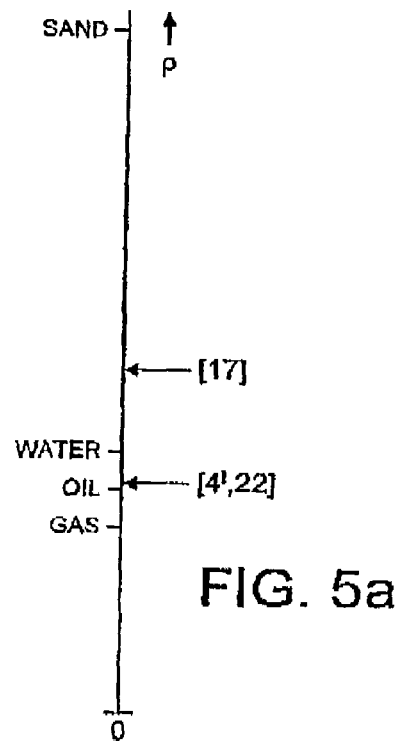

Reference is now made to the embodiment of FIG. 5, which is similar to that of FIG. 4 but uses an additional water/oil cyclone separator 22 rather than increase the loading on gravity separator 11. The cut point [22] for the further cyclone separator is the same as or similar to that of the gas/oil cyclone separator, 4', as shown in FIG. 5*a*.

More specifically, since the separation point of the first cyclone separator 4' is set as in the FIG. 4 embodiment such that not only the water and sand is separated from the incoming production stream, but also a minor proportion of the oil, the underflow leaving the lower outlet of the cyclone separator 4' consists of oily water and sand and the overflow leaving the upper outlet consists essentially only of oil and gas (negligible water is present). The presence of oil in the underflow is taken as confirmation that no water (or sand) is present in the overflow. The underflow of oily water/sand slurry passes along line 16 to cyclone separator 17 which separates the slurry into wet sand as underflow which passes along line 5 to sand accumulator 8, and oily water as overflow through the upper outlet of the cyclone separator. This mixture then passes along line 21 to the inlet to third cyclone separator 22 which effects a separation of the oily water into oil and water, the separated oil passing as overflow through the upper outlet of the cyclone separator along line 23 to be combined with the separated oil discharged along line 29 from gravity separator 11, to form a flow of oil in oil line 12. The separated water phase in cyclone separator 22 is discharged as underflow through the lower outlet of the cyclone separator and passes along line 14. Line 18 from gravity separator 11 is provided as a contingency in case any water should find its way into the gravity separator, in which case line 18 conveys that water to the water line 14.

With this embodiment, improved purity of the separated constituents of the production stream can be achieved with further reduced exposure to corrosive action of entrained sand.

Figure 6:
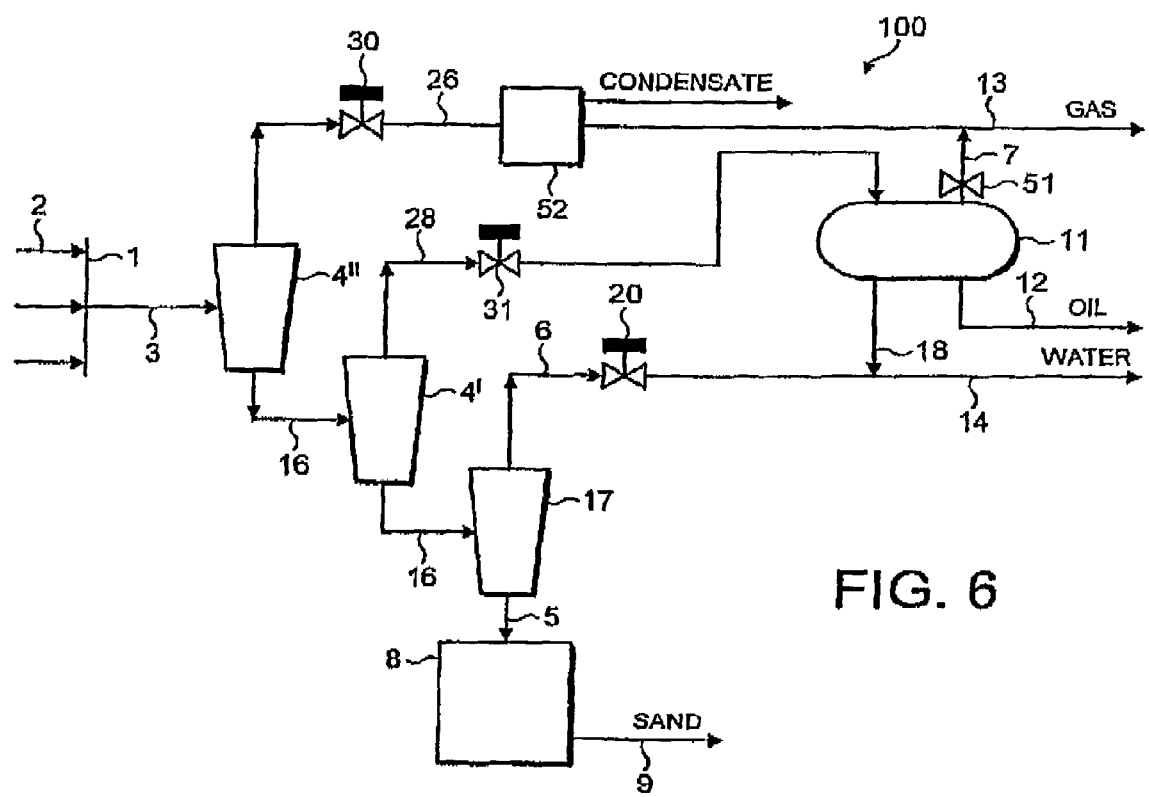
Figure 6A:
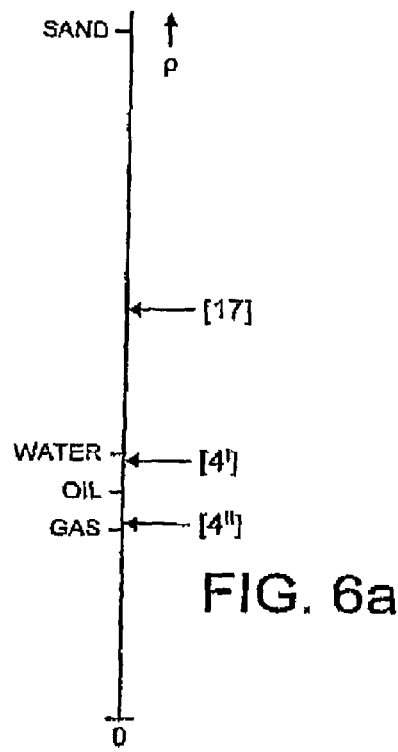

FIG. 6 shows a third embodiment in which, in effect, the first cyclone separator 4' of the first embodiment according to FIG. 3 is provided with a supplementary gas/oil cyclone separator (4"), which separates most of the gas from the teed. The cut point of the cyclone separator 4" is shown in FIG. 6*a* at [4"].

More specifically, the first cyclone separator 4" separates gas which is discharged through the upper, overflow outlet and flows along line 26. The underflow of the cyclone separator 4" exits through its lower axial outlet as an oil/water/sand mixture (including a minor amount of gas), which passes through line 27 to the tangential inlet of cyclone separator 4'. In this cyclone separator, oil and water and the minor amount of gas are discharged as overflow from the upper outlet of the cyclone separator and pass through line 28 to the gravity separator 11. Oil that collects in the separator 11 is discharged along oil line 12. Collected water is discharged along line 18. The gaseous atmosphere above the oil layer in gravity separator 11 is connected by line 7 to line 26 and the combined gas flows pass along line 13. The underflow from cyclone separator 4', which is a mixture of sand and water, is passed through line 16 to cyclone separator 17 which separates the water as overflow and wet sand as underflow, which is discharged from the lower outlet of the cyclone separator into sand accumulator 8. The water overflow discharged from cyclone separator 17 through its upper outlet flows in line 6 to be combined with water from the gravity separator 11 in line 18, to produce water flow passing through water line 14.

The staged cyclone separators 4", 4' are respectively provided with flow control valves 30, 31 in lines 26, 28, respectively. The use of staged cyclone separators ensures that the gas and oil in overflow lines 26, 28, respectively are of high purity.

It will be noted that overflow line 26 from cyclone separator 4" passes directly to gas line 13, i.e. it "flies by" the gravity separator 11. A cooling effect is produced by the expansion of gas in line 26, which produces condensate. Accordingly, a stripper 52 is provided in this line, to remove the condensate from the gas stream.

Figure 7:
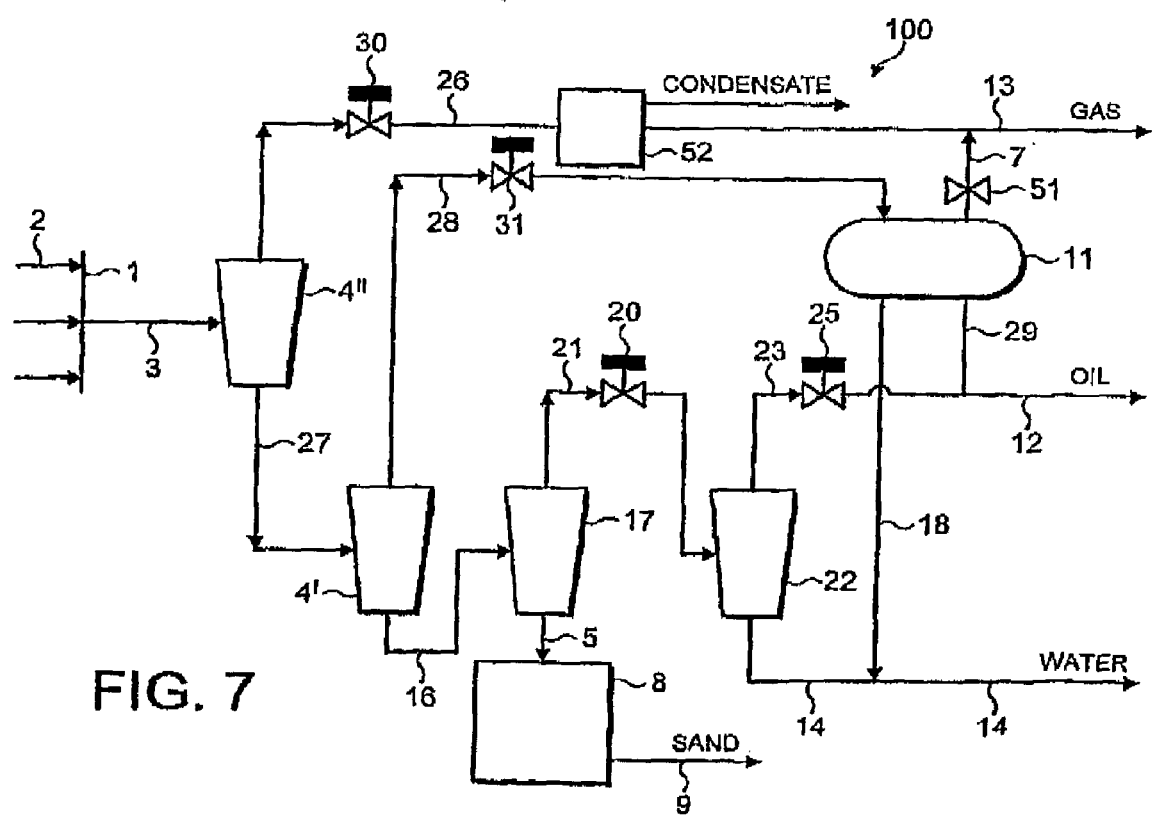

FIG. 7 shows a particularly preferred embodiment effectively based on the FIG. 5 embodiment but additionally employing gas/oil cyclone separator 4" such as in the FIG. 6 embodiment. The cut points for cyclone separators 4', 4", 17 and 22 are indicated at [4'], [4"], [17] and [22] in FIG. 7*a*. Since all remaining elements of the desanding plant have been described for the FIGS. 4 and 5 embodiments, no further description of the FIG. 7 plant is required. This embodiment combines the described advantages of the desanding plants according to FIGS. 5 and 6. It is remarked that line 18 is provided purely as a contingency against water unexpectedly collecting in gravity separator 11.

Figures 7A, 8:
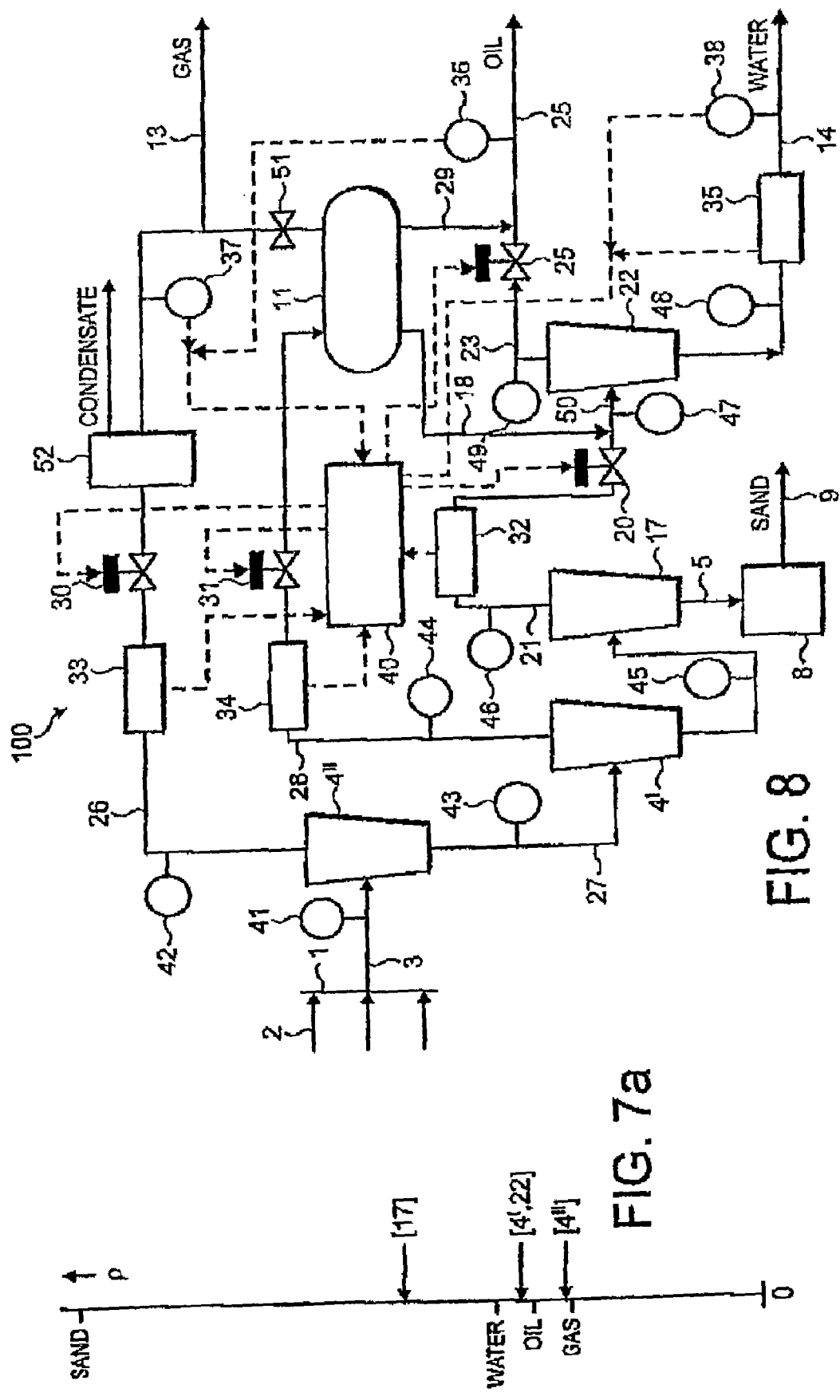
FIG. 8 is a schematic representation of a plant that is similar to that of FIG. 7, additionally showing the manner of control of each of the cyclone separators included in the plant.

Referring now to FIG. 8, the desanding plant shown is similar to that according to FIG. 7, but contains a modification. Specifically, line 18 is connected to line 21, so as to combine the water discharged from gravity separator 11 with the oily water discharged as overflow from cyclone separator 17. Therefore, any oil in line 18 will be separated front the water by oil/water separator 22.

In all of the described embodiments, the flow control valves in the lines for overflow from the respective cyclone separators are set to determine the separation (cut) points of the separators. Specifically, adjusting the setting of the valve changes the flow rate through that valve, and hence the input pressure to the cyclone, which determines the separation point. Each flow control valve may be set manually. However, it is preferred that the getting is done automatically by a suitable control system. FIG. 8 also indicates one possible manner in which the control valves 20, 25, 30, 31 may be controlled automatically.

Specifically, connected in series with each control valve 20, 30, 31 in the corresponding overhead line for overflow from the associated cyclone separator is a multiphase flow measuring device 32, 33, 34, respectively. Each such flow measuring device provides output signals representing the flowrate of the stream concerned and the volume percentages present of the constituent parts of that stream. In addition, a water analyser 35 is connected in water line 24/14 to provide an output signal representing the oil content of the produced water and multiphase flow measuring devices 36, 37, 38 are provided in oil, gas and water lines 12, 13, 14 to monitor the quality of the respective streams, by providing output signals representing the volume percentage present of each constituent, and the flowrate of the streams concerned. Pressure sensors may also be provided, such as pressure sensors 41 to 49 in lines 3, 26, 27, 28, 16, 21, 50, 14 and 23, respectively. Optionally temperature, sensors may also be provided to measure the temperatures of selected ones of the streams.

A control unit 40, such as a computer, receives the output signals from the flow measuring devices 32–35 and 36, 37 and 38, the water analyser 35, and the pressure and temperature sensors, when present, and in dependence on the values of these output signals, adjusts the settings of the control valves 20, 25, 30, 31, so as to optimise the quality of the controlled streams, and hence the quality (purity) of the oil, gas and water streams 12, 13, 14.

One preferred way of controlling the flow control valves is on the basis of primary and secondary data sources as set out in the following table.

| Cyclone separator | Controlled by | Data Source Primary | Secondary | Objective |
|---|---|---|---|---|
| 4″ | 30 + 31 | 33 + 34 | 37 | Gas quality |
| 4′ | 31 + 20 | 34 + 32 | 36 | Oil quality |
| 17 | 31 + 20 | 34 += | – | Water quality |
| 22 | 20 + 25 | 32 + 35 + 38 | – | Water quality |

Cyclone separator 4″ will be controlled to optimise the gas quality by adjusting valves 30 and 31. Flow measuring device 33 measures the gas flow and oil and water contents in the overhead stream from separator 4″. Flow measuring device 34 will monitor the gas contents in the overhead stream (oil stream) from separator 4″. Secondary control input will come from flow measuring device 37 to set the initial target gas flowrate.

Separator 4′ will be controlled to optimise the oil quality by adjusting valves 31, 20. Flow measuring device 34 measures the oil flow and gas and water contents in the overhead stream from separator 4′. Flow measuring device 32 will monitor the oil contents in the overhead stream (produced water stream) from separator 17. Secondary control input will come from flow measuring device 36 to set the initial target oil flowrate.

Separator 17 will be controlled to optimise the produced water quality by adjusting valves 31, 20. As already stated, flow measuring device 34 measures the oil flow and gas and water contents in the overhead stream from separator 4′. Flow measuring device 32 will monitor the oil contents in the overhead stream (produced water stream) from cyclone separator 17.

Separator 22 will be controlled to optimise the produced water quality by adjusting valves 20, 25. Flow measuring device 32 measures the water flow and oil contents in the overhead stream from separator 17. Produced water analyser 35 will monitor the oil contents in the produced water and flow measuring device 38 will measure the produced water flowrate.

Measured data will be collected by the flow control computer 40. The optimum setting of the control valves will be evaluated based on the flowrate and quality data and, in addition, on the desired output, where preferences are operator dictated to suit downstream enhancement equipment.

Suitable algorithms for use in effecting the desired control are numerous and will be known to those skilled in the art of control systems. Therefore, these will not be described in detail.

The constructionally simpler embodiments according to FIGS. 3 to 6 may be controlled automatically, in a similar manner. By way of example, a suitable manner of control for various embodiments will now be described.

In the FIG. 3 embodiment, the cyclone separator 4′ is intended to produce water (and sand) in the underflow that is of high quality, i.e. it contains substantially no oil or negligible oil. Therefore, the separation point of this separator is set to produce a small amount of water in the overflow line 10, and the stream in this line is monitored, using a flow measuring device, for the presence of water. Providing water is detected in this line, then it is known that there will be no or negligible oil in the line 16 since the separation point of the cyclone separator effects separation according to densities above and below the separation point. The small amount of water in the overflow from oil/water separator 4′ is removed in gravity separator 11.

A flow measuring device is also included in line 6 to monitor the sand properties present. The computer responds to the output signals from the flow measuring devices in lines 10 to 16 to control the separation points of the cyclone separator 4′, 17 such that the water quality in line 16 is optimised (no oil) and the water in line 6 contains no sand.

As for the FIG. 4 embodiment, the flow measuring devices in lines 6, 10 are used to monitor the respective overflow streams, and in particular the overflow produced by cyclone separator 4′ for the (substantial) absence of water and that from cyclone separator 17 for the (substantial) absence of sand.

Turning now to the FIG. 5 embodiment, the cyclone separator 4′ is set to produce a high quality of gas and oil overhead stream, by accepting a small amount of oil in the underflow stream. Cyclone separator 17 is set to remove all the sand present, and cyclone separator 22 then separates the stream consisting of the remaining constituents into oil and water. The emphasis will be an the quality of the produced gas and water. A flow measuring device would be used in line 16 to detect oil content, a flow measuring device in line 21 would detect sand content and a flow measuring device in line 23 would detect water content. The computer would respond to the output signals from these flow measuring devices to set the separation points of the cyclone separators in the manner described above to optimise the separation process.

In FIG. 6, cyclone separator 4″ is set to produce a high quality gas overhead stream. Therefore, it is necessary to ensure that the underflow from cyclone separator 4″ contains, a minor proportion of gas. For this purpose, a flow measuring device is used in line 27 to check for the presence of gas. Cyclone separator 4′ is set to produce water and sand only (substantially no oil present) as underflow, and a flow measuring device is used in overflow line 26 to check for the presence of water. The cyclone separator 17 is set to remove all the sand, leaving high quality water in the overflow. A flow measuring device in line 6 checks for the presence of sand. The computer sets the separation points of the cyclone separators according to the measurement signals it receives from the flow measuring devices.

The FIG. 7 embodiment is essentially the same as the FIG. 8 embodiment and a corresponding manner of control may be used.

It is stressed that the above described ways of automatically optimising the settings of the cyclone separators are merely exemplary and other possible ways of controlling the separation points of the cyclone separators will be apparent to the skilled addressee.

The manner of automatic control described above in the several embodiments involves controlling overhead flowrates, so as to optimise the settings of the cyclone separators. However, the principal parameter controlled could instead be the pressures of the corresponding stream, for example.

A preferred approach to the design of the control system, specifically in relation to each cyclone separator, is to set the quality of one of the two produced streams (overflow and underflow) according to the content in the other produced stream of the main constituent(s) forming the first stream.

Thus, for example, in the FIG. 6 embodiment, the quality of water in the underflow line 16 from cyclone separator 4' (quantified in terms of how little oil is present in that line) is set in dependence on the measured amount of water present in the oil stream leaving the separator 4' as overflow in line 28. If water is present in line 28, then there can be no oil present in line 16 since water has a higher density than oil. Such design philosophy may be used in the control system used in all embodiments of the invention. However, such manner of control is disclosed purely by way of example, and it will be appreciated that other types of control known to the skilled designer, alone or in combination, may be employed.

From the foregoing description, it will be appreciated that the disclosed desanding plants offer many advantages. In particular, the purity of the output streams (gas, oil and water) is improved as compared with results achieved with the conventional plant according to FIG. 1, thereby enhancing the value of the oil and gas products and enabling the recovered water to be reused with minimal or no further purification, depending on the required use for the water. For example, it could be used for reinjection into the well without any pre-treatment to improve purity.

Furthermore; the erosive effect of the entrained sand is minimised since it is separated from the wellstream at or near the point of entry into the desanding plant. Accordingly, the gravity separator is protected from erosion and the supply line leading to it is also protected. The cyclone separator(s) exposed to the entrained sand can be fitted with erosion resisting replaceable liners.

By positioning the desanding plant on the sea bed adjacent the inlet manifold 1, the length of line 3 can be shortened, thereby minimising the effect of erosion of this line caused by the entrained sand. In addition, since the demanding plant is located at the point of highest pressure, the gas phase is compressed to occupy the minimum space also to go into solution in the stream, thereby reducing the size of the components of the plant for any given operating capacity.

Another important advantage of the desanding plants described is that they achieve coalescence of the gas bubbles in the stream and also of the dispersed phase (generally oil droplets of an oil-in-water emulsion but it would be water droplets when a water-in-oil phase mixture is present).

In all described embodiments, the oil, gas and water to be discharged from the gravity separator may be removed continuously or periodically. Furthermore, the oil and gas lines 12, 13 may form a pipe bundle, optionally along with other lines to and/or from the well, directed in the form of a riser to a shore location or to an offshore platform or the like.

Whilst the preferred application is to separating the constituents of a production wellstream with enhanced recovery due to water injection in the well, it is not essential that water injection be used. Where no gas phase is present, the gravity separator could be vented to atmosphere. Furthermore, in the case of the embodiments according to FIGS. 6, 7 and 8, the first cyclone separator of the two-stage cyclone separators would not be needed. Where the hydrocarbon production fluid mixture in the stream comprises three or more phases (liquid phases, or a gas phase and liquid phases as the remaining phases), a complete, separation of the stream into its constituents may be achieved by including one or more additional cyclone separator stages, as appropriate.

It will be appreciated that in the embodiments described, each cyclone separator achieves separation of the production fluid into two streams of different densities, each stream containing one or more constituents. Furthermore, the separation point is set according to choice to achieve the desired separation of the constituents, by setting the input pressure at a desired value by adjustment of the setting of the control valve in the overflow line from the cyclone separator.

Finally, it is remarked that of course no cyclone separator can achieve one hundred percent exact separation as between constituents of its input stream, irrespective of how the cut points of the individual cyclone separators are set. Inevitably, trace amounts of constituents intended to exit primarily from one or the other outlet will be included in the flow from the other outlet. Even though ouch trace constituents are present, they are not mentioned or defined in this specification or its claims, except when specifically described.

The invention claimed is:

1. A method of recovering production fluid from a production well, which fluid contains a multi-phase mixture comprising oil and water and particles entrained therein, said method comprising:
   passing the production fluid from the well;
   then a first separating step of separating the production fluid passed from the well, by cyclonic separation at a separating point between the densities of the oil and water into a first portion that is rich in water and particles and a second portion that is rich in oil;
   a second separating step of separating the first portion of fluid into a third portion that has a higher water-to-particle ratio than said first portion and a fourth portion that has a higher particle-to-water ratio than said first portion; and
   a third separating step of separating water from the second fluid portion.

2. A method according to claim 1, wherein the production fluid also contains gas and further comprising separating the gas from the production fluid after the step of passing the production fluid from the well and before the first separating step.

3. A method according to claim 1, wherein the second step of separating is by cyclonic separation at a separating point between the densities of the particles and water, and particles in the fourth portion of fluid are accumulated to separate them from water in the fourth portion.

4. A method according to claim 1, wherein the third step of separating is by gravity separation.

5. A method according to claim 1, wherein the first portion of fluid contains water and substantially no oil and wherein the second portion of fluid contains oil and a minor proportion of water, and further comprising combining the third portion of fluid with the water separated from the second fluid portion.

6. A method according to claim 1, wherein the first portion of water contains water and a minor proportion of oil and the second portion of fluid contains oil and substantially no water, and wherein the third portion of fluid is combined with the second portion of fluid before the third step of separating.

7. A method according to claim 1, wherein the first portion of fluid contains water and a minor proportion of oil and the second portion of fluid contains oil and substantially no water, and wherein the water separated by the second separating step contains a lesser portion of oil than said first portion.

8. A method according to claim 1, further comprising measuring the water or oil content respectively of the first or second portion of fluid, and controlling a parameter of the second portion of the fluid to increase the water or oil content of the first or second portions, respectively.

9. A method according to claim 8, wherein said parameter is the flow rate of the second portion of the fluid.

10. A method according to claim 1 wherein the step of passing comprises passing the fluid directly from the well to apparatus for performing the first separating step.

11. A production fluid recovery installation comprising:
a source of production fluid comprising oil and water and particles entrained therein;
a first separator connected to the source externally of the well for receiving the production fluid and for cyclonically separating the production fluid, at a separation point between the densities of the oil and water, into a first portion that is rich in water and particles and a second portion that is rich in oil;
a second separator for separating the first portion of the fluid into water and particles; and
a third separator for separating any water from the oil in the second fluid portion.

12. An installation according to claim 11, wherein the production fluid also contains gas and further comprising means for separating the gas from the production fluid before the production fluid is received by the first separator.

13. An installation according to claim 11, further comprising means for combining the water separated by the second separator with the water separated by the third separator.

14. An installation according to claim 11, further comprising means for combining the water separated in the second separator with the second portion of fluid separated in the first separator, before the second portion of fluid enters the third separator.

15. An installation according to claim 11, further comprising a measuring device for measuring the water or oil contents respectively of the first or second portions of fluid, and means for controlling the flow rate of the second portion of the fluid in response to the measured values.

16. An installation according to claim 11, further comprising a manifold connected to the source and adapted to receive the production fluid from the source.

17. An installation according to claim 11, wherein the production fluid is passed directly from the well to the first separator.

* * * * *